(12) United States Patent
Greenhalgh et al.

(10) Patent No.: US 7,831,815 B2
(45) Date of Patent: Nov. 9, 2010

(54) DATA PROCESSING APPARATUS AND METHOD FOR IDENTIFYING SEQUENCES OF INSTRUCTIONS

(75) Inventors: Peter Richard Greenhalgh, Cambridge (GB); Stephen John Hill, Cambridge (GB)

(73) Assignee: ARM Limited, Cambridge (GB)

( * ) Notice: Subject to any disclaimer, the term of this patent is extended or adjusted under 35 U.S.C. 154(b) by 459 days.

(21) Appl. No.: 12/068,447

(22) Filed: Feb. 6, 2008

(65) Prior Publication Data

US 2009/0198978 A1    Aug. 6, 2009

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................................... 712/227
(58) Field of Classification Search ................... 712/227
See application file for complete search history.

(56) References Cited

U.S. PATENT DOCUMENTS 5,197,135 A * 3/1993 Eickemeyer et al. ......... 712/217
5,721,854 A * 2/1998 Ebcioglu et al. ............ 712/203
7,418,580 B1 * 8/2008 Campbell et al. ........... 712/227

OTHER PUBLICATIONS

Hazelwood et al.; Managing Bounded Code Caches in Dynamic Binary Optimization Systems; 2006; ACM Transactions on Architecture and Code Optimization.*
Stitt et al.; Dynamic Hardware/Software Partitioning: A first Approach; 2003; DAC '03.*
Lysecky et al.; Warp Processors; 2006; ACM Transactions on Design Automation of Electronic Signals.*

* cited by examiner

*Primary Examiner*—Eddie P Chan
*Assistant Examiner*—Corey Faherty
(74) *Attorney, Agent, or Firm*—Nixon & Vanderhye P.C.

(57) ABSTRACT

A data processing apparatus is provided comprising a processing unit for executing instructions, a cache structure for storing instructions retrieved from memory for access by the processing unit, and profiling logic for identifying a sequence of instructions that is functionally equivalent to an accelerator instruction. When such a sequence of instructions is identified, the equivalent accelerator instruction is stored in the cache structure as a replacement for the first instruction of the sequence, with the remaining instructions in the sequence of instructions being stored unchanged. The accelerator instruction includes an indication to cause the processing unit to skip the remainder of the sequence when executing the accelerator instruction.

15 Claims, 9 Drawing Sheets

Original instruction sequence fetched from main memory

| Instr-0 (Candidate for Substitution) | Instr-1 (Candidate for Substitution) | Instr-2 (Candidate for Substitution) | Instr-3 |
|---|---|---|---|
| 200 | 210 | 220 | 230 |

Modified instruction sequence stored in the instruction cache

| Instr-0 (Dedicated Instr) | Instr-1 (Unmodified Instr) | Instr-2 (Unmodified Instr) | Instr-3 |
|---|---|---|---|
| 240 | 250 | 260 | 270 |

FIG. 3

DATA PROCESSING APPARATUS AND METHOD FOR IDENTIFYING SEQUENCES OF INSTRUCTIONS

BACKGROUND OF THE INVENTION

1. Field of the Invention

The present invention relates to storing instructions in a cache for access by a data processing apparatus. More particularly, this invention relates to identifying particular sequences of instructions being stored in such a cache.

2. Description of the Prior Art

A common goal in the development of data processing apparatuses is to improve performance with respect to older data processing apparatuses. There are various ways in which this can be achieved. One known technique for improving the performance of a data processing apparatus is to introduce one or more new instructions in the instruction set of the data processing apparatus, in particular a dedicated instruction motivated by the intended application of the data processing apparatus, for example an instruction for carrying out a particular mathematical function in a data processing apparatus that must repeatedly carry out that mathematical function. The new data processing apparatus must of course then be configured to understand the new instruction and respond appropriately. Whilst this is generally possible, because an instruction set will often have many "spare" encodings that are unused, this approach has the disadvantage that new software that is written using the new instruction is not "backwards-compatible" with older data processing apparatuses created before the introduction of the new instruction and therefore unable to understand it.

Conversely, whilst it may be possible to run on the new data processing apparatus software written before the introduction of the new instruction, this software will not take advantage of the new data processing apparatus' new functionality with regard to the new instruction, and hence the performance benefit will not be realised for such "legacy" software. In order to make use of the new functionality it will then be necessary to re-write the old software, substituting the new instruction where appropriate.

Thus, it would be desirable to provide a technique for improving the performance of a new data processing apparatus, without creating backward compatibility problems for new software and without having to rewrite old software to take advantage of the performance improvement.

In the x86 architecture it is known to decode CISC instructions into RISC micro-ops specific to the micro-architecture of the processor core, once the CISC instructions have been fetched from the instruction cache. Similarly the IBM PowerPC 970 creates IOPs specific to the micro-architecture form the instructions fetched from the instruction cache. Intel's Pentium-4 stores micro-ops in a level-1 cache known as a trace cache. Intel's Pentium-M uses an approach called micro-op fusion after the instruction cache, which allows a single x86 instruction that is usually broken into two micro-ops to proceed through the evaluation stages as if they are one, be dispatched separately and finally recombined at the retire stage.

SUMMARY OF THE INVENTION

Viewed from a first aspect, the present invention provides a data processing apparatus comprising: a processing unit for executing instructions; a cache structure for storing instructions retrieved from memory for access by said processing unit; and profiling logic for identifying a sequence of instructions that is functionally equivalent to an accelerator instruction; wherein upon said identification said accelerator instruction is stored in the cache structure as a replacement for a first instruction of said sequence, with instructions in said sequence of instructions other than said first instruction being unchanged as a result of said identification; and said accelerator instruction includes an indication to cause the processing unit to skip the remainder of said sequence when executing said accelerator instruction.

According to the present invention, instructions retrieved from memory are stored in a cache structure for access by the processing unit of a data processing apparatus. Profiling logic monitors the series of instructions that has been retrieved from memory and identifies a sequence of instructions which is functionally equivalent to an accelerator instruction. That is, by executing this accelerator instruction instead of the sequence of instructions, the same output of the processing unit will result. This accelerator instruction is then stored in the cache structure as a replacement for the first instruction of the identified sequence of instructions, the accelerator instruction including an indication to cause the processing unit to skip the remainder of the identified sequence of instructions when executing the accelerator instruction. Hence, when the instruction at the instruction address associated with the first instruction is fetched by the processing unit, the processing unit will instead execute the accelerator instruction and then automatically jump to the instruction that follows the identified sequence of instructions.

Also, by using one accelerator instruction as a replacement for a series of instructions in a sequence, performance and power benefits result, since not only may it be possible for the accelerator instruction to more efficiently produce the desired result of the sequence of instructions when executed, but also fewer instructions need to pass through the execution stream of the processing unit (fetch, decode, issue etc.)

Furthermore, when the sequence of instructions is stored in the cache structure, because the other instructions in the sequence of instructions have been stored unchanged, if the program flow of the processing unit should branch into a point midway through the sequence of instructions, these instructions will execute normally without being affected by the replacement of the first instruction by the accelerator instruction. Thus, despite the accelerator instruction being stored in the cache structure as a replacement for a first instruction of the sequence, the length of the original sequence of instruction is unchanged and memory addressing is unaffected.

The profiling logic may identify the sequence of instructions at various points in the data processing apparatus. According to one embodiment, the profiling logic identifies the sequence of instructions before the sequence is stored in the cache structure (referred to herein as a static profiling arrangement). Thus, for instructions retrieved from memory and stored in the instruction cache, sequences of instructions that are functionally equivalent to an accelerator instruction are identified after retrieval from memory but before storing in the cache structure, with the first instruction of such a sequence being replaced by an appropriate accelerator instruction prior to storage in the cache structure. In another embodiment, the profiling logic identifies the sequence of instructions when instructions are fetched from the cache structure by the processing unit. This dynamic profiling arrangement thus monitors the instructions as they are fetched from the cache structure by the processing unit and when a sequence is recognised, the first instruction is replaced with the accelerator instruction in the cache structure.

It will be understood that the cache structure can take a variety of forms, but in one embodiment the accelerator instruction is stored in place of the first instruction of the identified sequence. Thus, the accelerator instruction simply replaces the first instruction of the identified sequence in the cache structure. In this embodiment, the accelerator instruction is constrained to be the same length as the first instruction, so as not to affect addressing of later instructions in the sequence.

Alternatively, according to another embodiment, the cache structure comprises a first cache for storing the instructions retrieved from memory and a dedicated accelerator instruction cache for storing the accelerator instruction. According to this arrangement the sequence of instructions is stored in the first cache unamended and only the accelerator instruction is stored in the dedicated instruction cache. Later, if the processing unit seeks to fetch the first instruction of the sequence from the cache structure, then the associated accelerator instruction stored in the dedicated accelerator instruction cache will override that first instruction of the sequence of instructions. In an embodiment where the accelerator instructions are stored in a dedicated accelerator instruction cache the accelerator instruction may be a different length to the first instruction of the identified sequence. Being stored in a physically different location there is no constraint for these two instructions to be of the same length, giving advantageous flexibility to the format of the accelerator instruction.

According to one embodiment, when the accelerator instruction is stored in the cache structure as a replacement for a first instruction of the sequence, the profiling logic further stores the accelerator instruction in an eviction repopulation cache along with an address identifier for the first instruction in the sequence. In a data processing apparatus where significant power and/or time is expended in identifying the sequences of instructions for replacement by an accelerator instruction, it is thus advantageous to cache in an eviction repopulation cache accelerator instructions that have already been used to replace the first instruction of a sequence, such that the next time that sequence is identified, the accelerator instruction may be quickly retrieved from the eviction repopulation cache rather than being generated anew by the profiling logic. Thus, if the accelerator instruction is evicted from the cache structure, and the sequence of instructions is subsequently refetched from memory, the accelerator instruction is identified in the eviction repopulation cache with reference to the address identifier for the first instruction in the sequence, and restored in the cache structure as the replacement for the first instruction of the sequence without further analysis by the profiling logic.

Whilst the accelerator instruction could be a modified instruction that is executed by the usual instruction execution units of the processing unit, in one embodiment the processing unit comprises a hardware accelerator unit for executing the accelerator instruction. In this way, dedicated hardware may be provided for executing particular accelerator instructions, for example specially arranged to perform the required operations more efficiently than if the standard execution units were used to perform the required operations.

According to one embodiment, the profiling logic comprises profiling circuitry. Dedicated profiling circuitry may be an advantageously efficient way to provide the profiling logic functionality. In another embodiment the profiling logic comprises profiling software executed by the processing unit. Being embodied in software, this may allow the profiling logic to be advantageously reconfigurable.

According to an embodiment of the present invention, the profiling logic buffers a plurality of received instructions, and compares the buffered instructions with at least one predetermined instruction sequence definition, each predetermined instruction sequence definition being associated with the accelerator instruction, if said buffered instructions match one of the at least predetermined instruction sequence definitions, the profiling logic generating the associated accelerator instruction. By buffering as many instructions as it may be required to identify in a particular sequence, the profiling logic keeps a running window of the instructions it has received to be able to compare these to at least one predetermined instruction sequence definition and, when a match occurs, generates the corresponding accelerator instruction. Whilst in the simplest arrangement there could just be one accelerator instruction for which the profiling logic may replace a sequence of instructions, in one embodiment there are a plurality of accelerator instructions for which the profiling logic seeks to identify a sequence of instructions functionally equivalent thereto.

Viewed from a second aspect, the present invention provides a method of processing data comprising the steps of: retrieving instructions from memory for storage in a cache structure for access by a processing unit; identifying a sequence of instructions that is functionally equivalent to an accelerator instruction; and storing said accelerator instruction in the cache structure as a replacement for a first instruction of said sequence, with instructions in said sequence of instructions other than said first instruction being unchanged as a result of said identifying step; wherein said accelerator instruction includes an indication to cause the processing unit to skip the remainder of said sequence when executing said accelerator instruction.

Viewed from a third aspect, the present invention provides a data processing apparatus comprising: processing means for executing instructions; cache means for storing instructions retrieved from memory for access by said processing means; and profiling means for identifying a sequence of instructions that is functionally equivalent to an accelerator instruction; wherein upon said identification said accelerator instruction is stored in the cache means as a replacement for a first instruction of said sequence, with instructions in said sequence of instructions other than said first instruction being unchanged as a result of said identification; and said accelerator instruction includes an indication to cause the processing means to skip the remainder of said sequence when executing said accelerator instruction.

BRIEF DESCRIPTION OF THE DRAWINGS

The present invention will be described further, by way of example only, with reference to embodiments thereof as illustrated in the accompanying drawings, in which:

FIG. 3 illustrates example original and modified instruction sequences;

DESCRIPTION OF THE PREFERRED EMBODIMENTS

Figure 1:
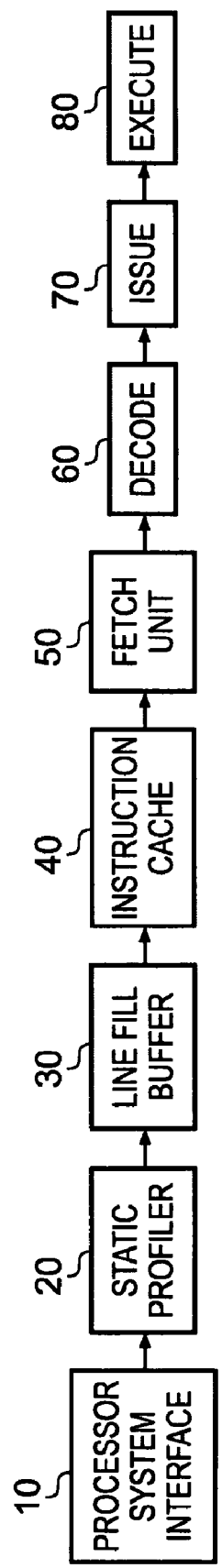
FIG. 1 schematically illustrates a data processing apparatus according to one embodiment of the present invention.

FIG. 1 schematically illustrates a series of components making up a data processing apparatus according to one embodiment of the present invention. The processor system interface 10 is the means by which the data processing apparatus interacts with the remainder of the processing system (not illustrated), in particular it is the means by which the data processing apparatus accesses instructions stored in a memory of the system. Instructions retrieved from memory pass via static profiler 20 (to be explained in more detail below) to linefill buffer 30. Linefill buffer 30 is arranged to buffer sufficient instructions to fill an entire cache line of instruction cache 40, passing a full cache line's worth of instructions to instruction cache 40. Fetch unit 50 is used to issue access requests to the instruction cache to retrieve instructions required for execution by the execution unit of the data processing apparatus, in the event of a cache hit the required instruction being retrieved directly from instruction cache 40, or in the event of a cache miss the instruction being retrieved from memory (via processor system interface 10) for storage in instruction cache 40. Instructions retrieved by fetch unit 50 are decoded by decode unit 60, before being issued by issue unit 70 to the appropriate execution pipeline of execute unit 80.

The profiling unit in this embodiment is static profiler 20. This profiler monitors the series of instructions being passed from processor system interface 10 (via linefill buffer 30) to be stored in instruction cache 40. When static profiler 20 identifies a sequence of instructions that is functionally equivalent to an accelerator instruction, it causes the accelerator instruction to be stored in instruction cache 40 as a replacement for the first instruction of the sequence. The remainder of the instructions in the sequence are stored in instruction cache 40 unchanged (unless one of these instructions is the first instruction in another identified sequence of instructions). The accelerator instruction stored as a replacement for the first instruction of the sequence includes an indication to cause the remainder of the sequence to be skipped when the accelerator instruction is executed. Thus, when the processing unit of the data processing apparatus seeks to retrieve the first instruction of that sequence from instruction cache 40, in its place the accelerator instruction is retrieved and the remainder of the instructions in the sequence are skipped. However, if the processing unit should branch into a point in the sequence of instructions after the first instruction, then the instructions that form the remainder of the sequence from that point will be fetched, decoded and executed exactly as if the first instruction had not been replaced.

Figure 2:
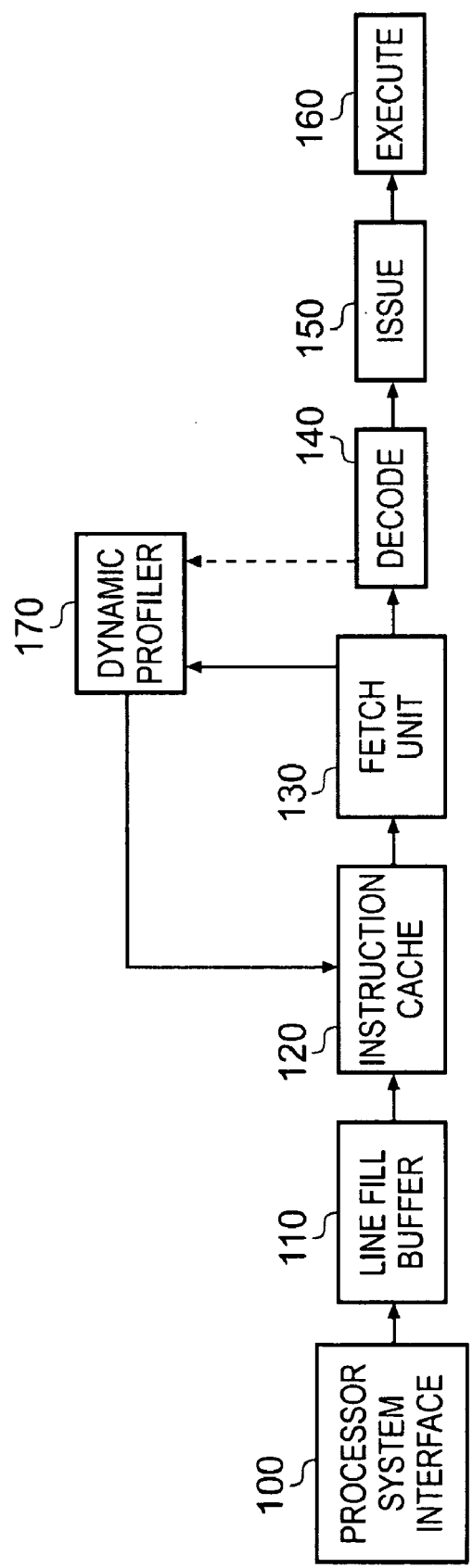
FIG. 2 schematically illustrates a data processing apparatus according to another embodiment of the present invention.

FIG. 2 schematically illustrates a series of components making up a data processing apparatus according to another embodiment of the present invention. Most of the component parts, namely processor system interface 100, linefill buffer 110, instruction cache 120, fetch unit 130, decode unit 140, issue unit 150 and execute unit 160 behave just as the corresponding components in FIG. 1 and will not be described in further detail. However, in this embodiment the profiling unit is dynamic profiler 170 which monitors the instructions being retrieved from instruction cache 120 by fetch unit 130. Alternatively, as illustrated by the dashed line in FIG. 2, the dynamic profiler 170 could monitor the instructions being decoded by decode unit 140. When the dynamic profiler 170 identifies a sequence of instructions that is functionally equivalent to an accelerator instruction, the dynamic profiler 170 causes the accelerator instruction to be stored in instruction cache 120 as a replacement for the first instruction of that sequence. Although the embodiments illustrated in FIGS. 1 and 2 are both level 1 caches, it will be appreciated by the skilled person that the technique of this invention could equally be applied to other cache levels in a processing system.

FIG. 3 illustrates two sequences of instructions according to the embodiment illustrated in FIG. 1. The sequence of instructions 200, 210, 220 and 230 are fetched from main memory, whereby static profiler 20 identifies that the sequence of instructions 200, 210 and 220 are functionally equivalent to an accelerator instruction. Thus, when the retrieved instruction sequence is stored in instruction cache 40, instruction 200 is replaced by an accelerator (i.e. dedicated) instruction 240, whereas instruction 210 is stored unmodified as instruction 250, and instruction 220 is also stored unmodified as instruction 260. Instruction 230 (being unrelated to the sequence of instructions identified) is also stored unmodified as instruction 270. Hence, when the processing unit seeks to retrieve instruction 200 from the instruction cache, in its place the dedicated accelerator instruction 240 is retrieved and the processing unit is caused to skip instructions 250 and 260, proceeding after execution of the accelerator instruction with instruction 270. If however the processing unit branches into the instruction cache at an address corresponding to instruction 210, then this instruction is found in the cache stored unmodified as instruction 250, and accordingly can be executed in the usual way. After this instruction (assuming no further branches) instructions 260 and 270 are retrieved and executed.

Some example sequences of instructions (provided purely for illustration) for which an accelerator instruction could be substituted are, for example:

1) CMP r0, #0
   BNE

These two instructions ("compare" followed by "branch if not equal") could be replaced in this instance with a single instruction to "compare and branch on non-zero" since the compare instruction is comparing against the value 0 (indeed this functionality is provided in the ARM architecture by the instruction CBNZ).

2) MOV #0, r0
   MOV #0, r1
   MOV #0, r2
   MOV #0, r3
   STM {r0, r3}

This sequence of instructions (four "move" instructions followed by a "store multiple" instruction) is used to set several memory locations to zero. In this case, an accelerator instruction could be created that did a 'move-multiple' of zero to multiple registers (it would also be possible to combine the MOV instructions and the STM instruction).

3) SMULL r0,r1,r0,r1
   LSRS r0,r0,#16
   ORR r0,r0,r1,LSL #16

These four instructions ("signed long multiply", "logical shift right" and "bitwise OR" (with one operand being subjected to "logical shift left")) are a commonly used graphics-related sequence. In order to execute this more complicated set of instructions in a small number of cycles, a dedicated execution unit could be created (see later discussion with reference to FIG. 8). Alternatively, the accelerator instruction could use existing hardware over multiple cycles, which would be less advantageous on performance, but would be more power efficient.

4) ADD
   UXTB

This combination of instructions is regularly used in the C programming language to cast from an integer back to a char. A single accelerator instruction could combine these instructions into one.

Figure 4A:
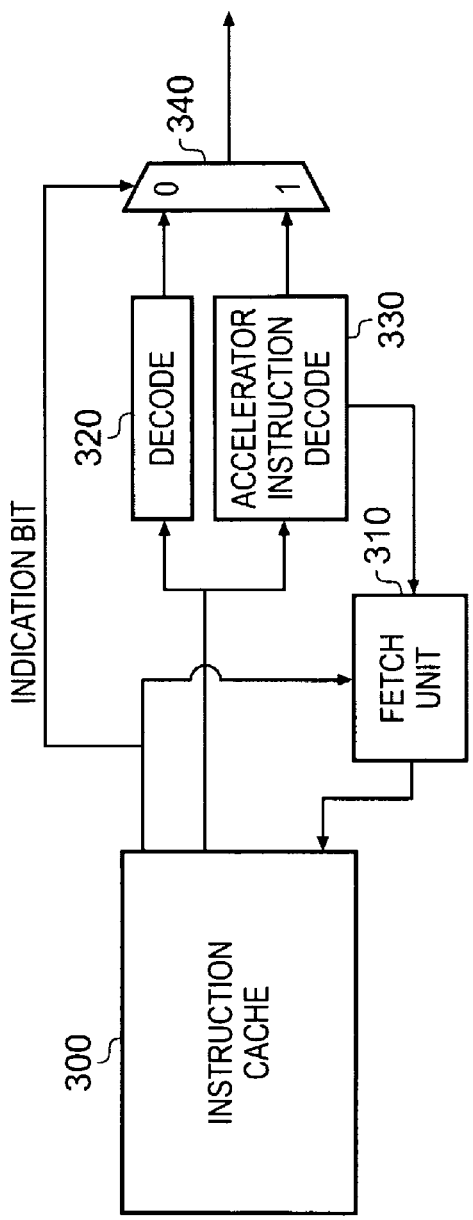
FIG. 4A schematically illustrates an instruction cache, fetch unit and decoders according to one embodiment of the present invention.
Figure 4B:
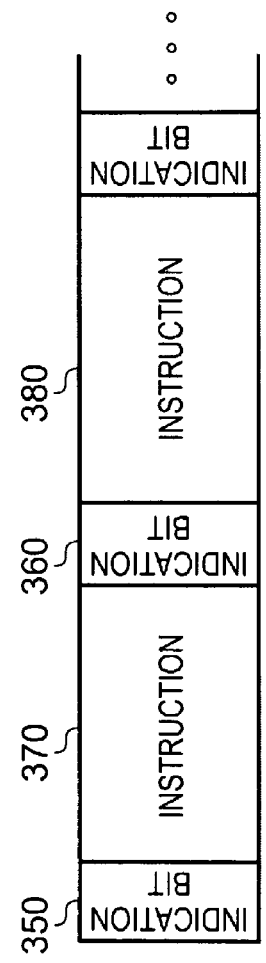
FIG. 4B illustrates a cache line in the instruction cache of FIG. 4A.

FIG. 4A schematically illustrates how instructions are retrieved from an instruction cache and decoded. Fetch unit 310 causes a particular instruction to be retrieved from instruction cache 300 by issuing an instruction access request. If that instruction is not to be found in instruction cache 300, then the instruction is retrieved from main memory. If however the instruction is stored in instruction cache 300, it will (in this embodiment) have been stored there with an associated indication bit indicating whether this instruction is an accelerator instruction or not. An example cache line is illustrated in FIG. 4B where instructions 370 and 380 have indication bits 350 and 360 prepended to them. In the embodiment illustrated in FIG. 4A, if this indication bit is not set then this indicates that the instruction is not an accelerator instruction and, although the instruction will be passed to both standard decode unit 320 and accelerator instruction decode unit 330, it will be the output of decode unit 320 that will finally be output due to the steering via the indicator bit of multiplexer 340. Conversely, if the indication bit indicates that the instruction is an accelerator instruction, then the output of accelerator instruction decode unit 330 will be output via multiplexer 340. Furthermore, if the indication bit is set, indicating that the instruction is an accelerator instruction, this indicates to the fetch unit that a number of following instructions should be skipped. How many instructions should be skipped is indicated to the fetch unit by an output of accelerator instruction decode unit 330.

Whilst in FIG. 4B the indication bits are shown prepended to each instruction, it will be appreciated that those indication bits could alternatively be stored separately to the instructions themselves, for example in a separate storage structure accessed in parallel to the lookup in the instruction cache storage storing the instructions themselves.

Figure 5:
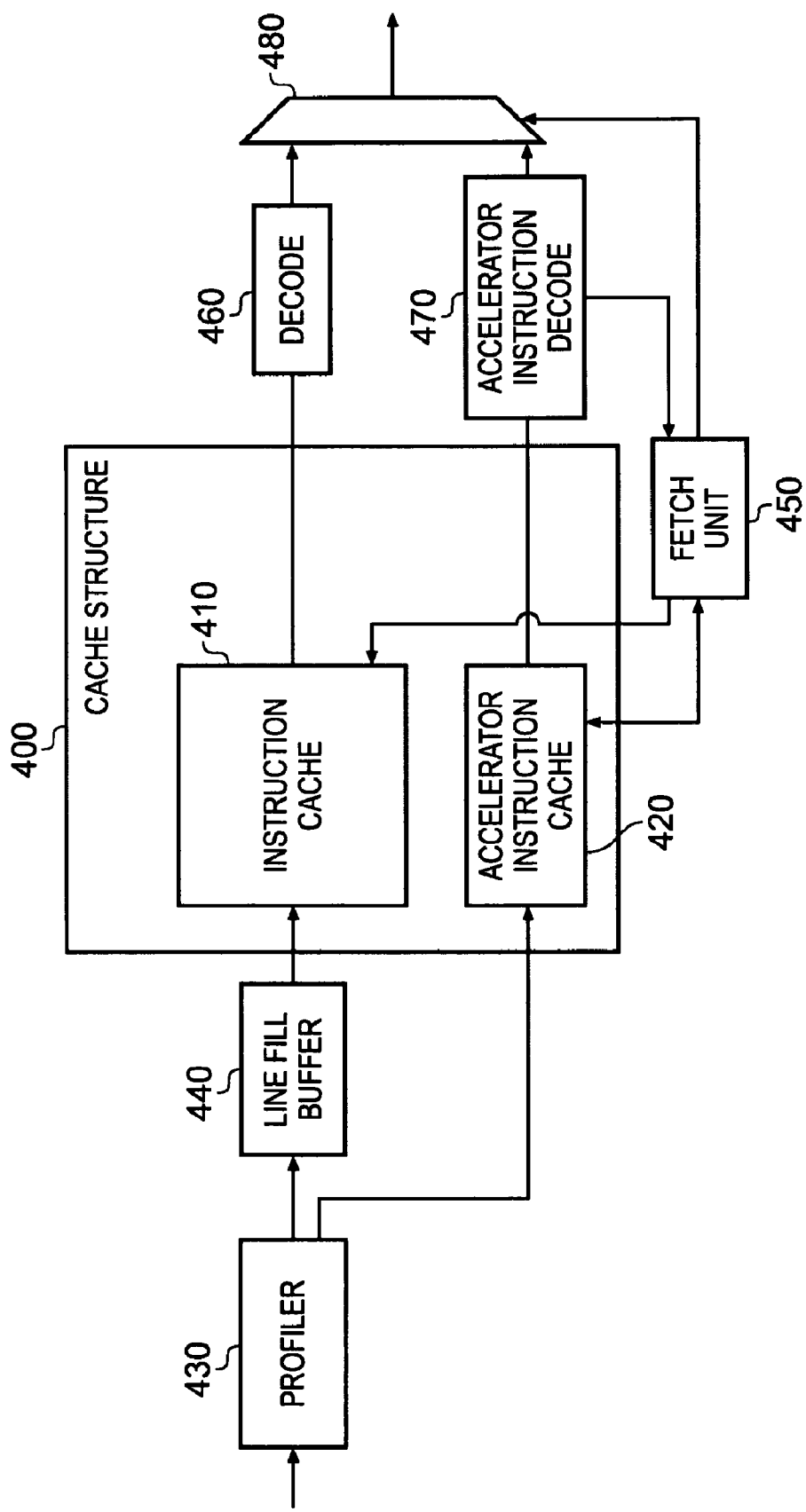
FIG. 5 schematically illustrates a data processing apparatus according to one embodiment of the present invention.

FIG. 5 illustrates an embodiment in which a dedicated accelerator instruction cache is provided for storing the accelerator instructions. In this embodiment, cache structure 400 comprises instruction cache 410 and accelerator instruction cache 420. Profiler 430 receives the instructions being retrieved from main memory and passes them to linefill buffer 440 for filling cache lines of instruction cache 410. If however profiler 430 identifies a sequence of instructions that is functionally equivalent to an accelerator instruction, then profiler 430 causes that accelerator instruction to be stored in accelerator cache 420 as a replacement for the first instruction of that sequence. When the fetch unit 450 requests an instruction by specifying an instruction address, a cache lookup is performed in cache structure 400. If the instruction is not stored in the cache structure 400, then it is retrieved from main memory. If however the instruction is stored in instruction cache 410, then it is read out to decode unit 460 for decoding. If additionally an accelerator instruction is found in accelerator instruction cache 420 for that instruction address, it is read out to accelerator instruction decode unit 470. The fact that the instruction has been found in accelerator instruction cache 420 is also indicated to fetch unit 450 which controls the steering of multiplexer 480, which in turn controls which instruction decoders output is passed to the issue unit of the processing unit. Furthermore, the fact that the instruction has been found in accelerator instruction cache 420 indicates to fetch unit 450 that a number of following instructions should be skipped. How many instructions should be skipped is received by fetch unit 450 as a signal from accelerator instruction decode unit 470. Fetch unit 450 then steers multiplexer 480 to output the decoded accelerator instruction from accelerator instruction decode unit 470.

Figure 6:
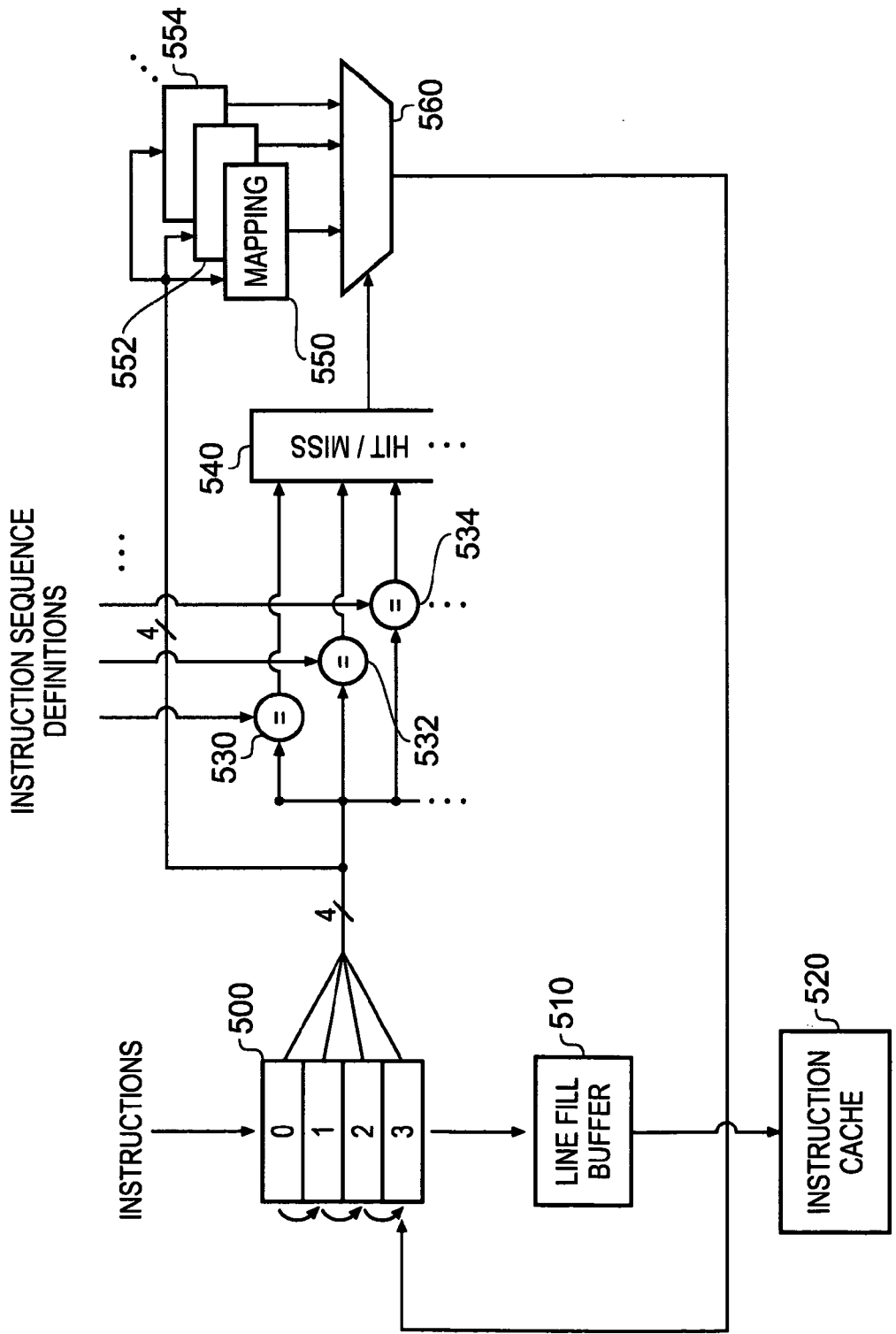
FIG. 6 schematically illustrates the construction of a profiler as used in one embodiment of the present invention.

FIG. 6 schematically illustrates in more detail the construction of a static profiler such as the static profiler 20 illustrated in FIG. 1. Instructions received from the processor system interface are buffered in instruction buffer 500. This FIFO buffer has four entries such that the profiler maintains a rolling window of four instructions in which it can identify a sequence of instructions that is functionally equivalent to an accelerator instruction. FIFO instruction buffer 500 has four entries in this embodiment since it is known in this example data processing apparatus that the longest sequence of instructions that will need to be identified is four instructions long. In other example embodiment systems, this sequence length could vary and the FIFO buffer will then vary in length accordingly. In the situation where a sequence of instructions is not identified in FIFO buffer 500, the oldest instruction in the buffer is passed to linefill buffer 510 and from there is transferred to instruction cache 520.

The identification of a sequence of instructions that is functionally equivalent to an accelerator instruction is made by means of instruction sequence definitions which configure the series of comparators 530, 532 and 534. Note that for clarity only three comparators have been illustrated and there could be many more, there being as many comparators as there are potential instruction sequence definitions. An indication of each of the four instructions stored in FIFO buffer 500 is passed to each of the comparators. It will be appreciated that in embodiments where a given comparator is only seeking to match a sequence of, say, three instructions, then only an indication of three instructions (say the instructions in positions 3, 2 and 1 in FIFO buffer 500) need be passed to that particular comparator. If one of the comparators registers a hit, i.e. one of the predefined instruction sequence definitions has been matched, it signals this hit to hit/miss logic 540. The indication of the four instructions presently in FIFO buffer 500 is also passed to the mapping logic units 550, 552 and 554, each mapping logic unit producing an associated accelerator instruction. As in the case of the comparators only three mapping logic units have been illustrated here in the interests of clarity. However, there could be many more, there being as many mapping logic units as there are comparators. Each of the mapping logic units converts the sequence of instructions into the associated accelerator instruction, passing its output to multiplexer 560. Multiplexer 560 is steered by the output of hit/miss unit 540 to select the corresponding accelerator instruction depending on which comparator registered the hit. When there is a hit in one of the comparators, the corresponding output from multiplexer 560 is then substituted for the oldest instruction in FIFO buffer 500 (i.e. the first instruction in the identified sequence) and is then passed to linefill buffer 510 to be stored in instruction cache 520. It should be noted that when this replacement instruction is transferred to the linefill buffer 510, the remaining instructions in the identified sequence are still held in FIFO buffer 500 (shifted on by one entry) and it is therefore possible for a nested sequence of instruction replacements to occur.

Whilst the embodiment shown in FIG. 6 is shown in the context of a static profiler, it will be appreciated that this arrangement could also be used for dynamic profiling, the input to instruction buffer 500 then coming from the fetch unit (or the decode stage), and the linefill buffer being omitted.

Figure 7B:
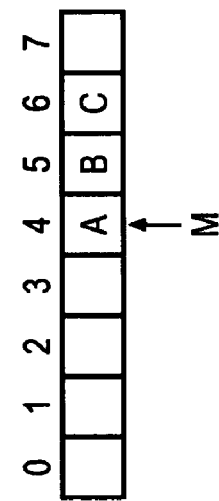
FIG. 7B illustrates the replacement of a first instruction of a sequence of instructions by an accelerator instruction.
Figure 7A:
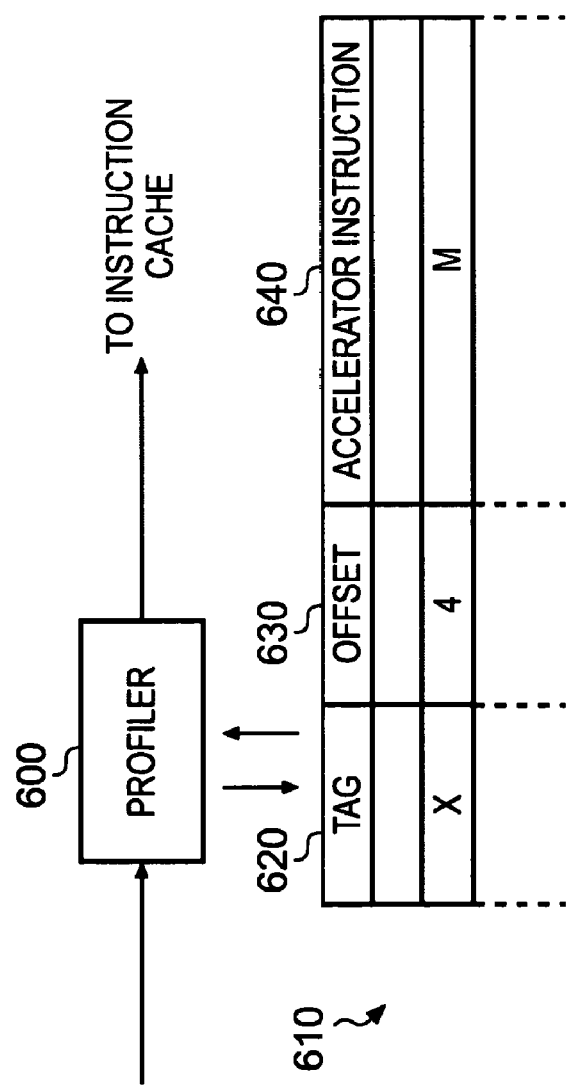
FIG. 7A schematically illustrates the use of an eviction repopulation cache.

FIG. 7A schematically illustrates the use of an eviction repopulation cache to which the profiling unit has access. In this illustrated example embodiment, the profiling unit is a static profiler such as that illustrated in FIG. 1. Profiler 600 has access to eviction repopulation cache 610 comprising a set of tag entries 620, a set of offset entries 630 and a set of accelerator instruction entries 640. This eviction repopulation cache represents a fast means of identifying accelerator instruction replacements that have already been identified once by the profiling unit. This then saves the power and time associated with identifying and mapping instruction sequences as illustrated in FIG. 6. The eviction repopulation cache 610 of FIG. 7A is illustrated with an example entry corresponding to the instruction sequence illustrated in FIG. 7B. In this example series of eight instructions (which could for example represent a cache line) the fifth, sixth and seventh instructions A, B and C (at positions 4, 5 and 6) have been identified as a sequence of instructions that is functionally equivalent to accelerator instruction M. Thus, the entry in eviction repopulation cache 610 comprises tag X corresponding to the memory address of this cache line, together with an offset for indicating the location within this cache line of the accelerator instruction, and an indication of accelerator instruction M that should be stored as a replacement for the first instruction A of the sequence. Note that in this example accelerator instruction M will contain an indication that the two following instructions B and C should be skipped, i.e. the next instruction to be executed after accelerator instruction M will be that found in location 7 of the example cache line of FIG. 7B.

The eviction repopulation cache 610 is populated by the profiler 600. When the profiler 600 identifies a sequence of instructions that is functionally equivalent to accelerator instruction, it passes an indication of the corresponding tag, offset and accelerator instruction to the eviction repopulation cache 610. These are then stored in an available entry of the eviction repopulation cache 610, or, if no entries are available, a victim entry for overwriting is selected by a known mechanism such as least-recently-used. Whilst FIG. 7A illustrates an eviction repopulation cache in the context of a static profiler, it will be appreciated that the eviction repopulation cache could equally be employed in a dynamic profiling context, being populated and referenced by a dynamic profiler such as that illustrated in FIG. 2. In this dynamic profiling context, the eviction repopulation cache could alternatively be populated by the dynamic profiler, but referenced by, for example, processor system interface 100, so that previously identified (by the dynamic profiler) sequences of instructions could be spotted as soon as they are retrieved from main memory, via the processor system interface.

Figure 8:
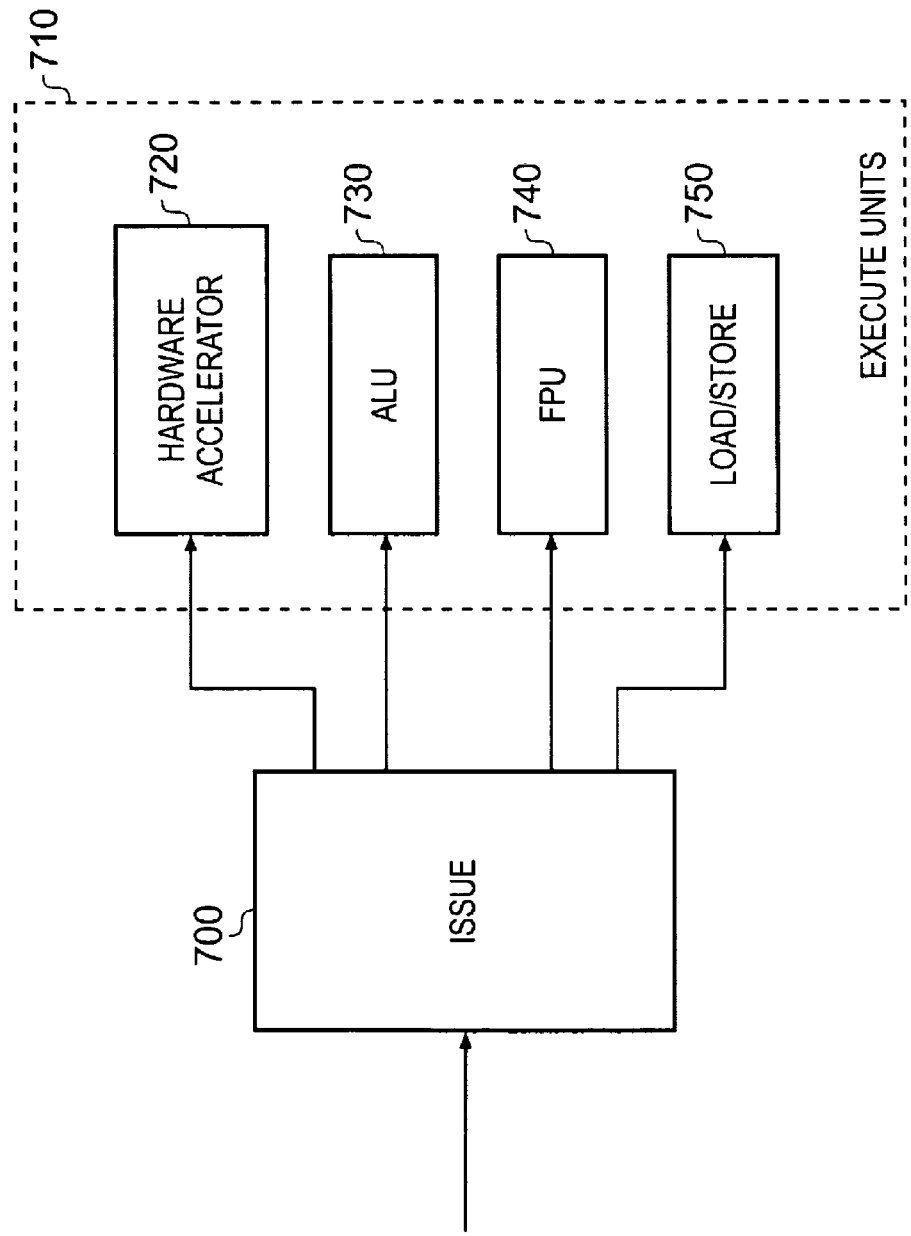
FIG. 8 schematically illustrates a processing unit having a dedicated accelerator instruction execution unit.

FIG. 8 schematically illustrates a processing unit having a dedicated accelerator instruction execution unit. Issue unit 700 receives decoded instructions and passes them to the appropriate execution unit 710. In this example embodiment the execution units comprise hardware accelerator execution unit 720, arithmetic logic unit (ALU) 730, floating point unit (FPU) 740, and load/store unit 750. The hardware accelerator unit 720 can be provided to receive at least selected ones of decoded accelerator instructions that have replaced the first instruction of identified sequences of instructions and, being a dedicated piece of hardware, may particularly efficiently execute that instruction thus saving potentially both time and power over the execution of that accelerator instruction in one of the standard execution units.

Figure 9:
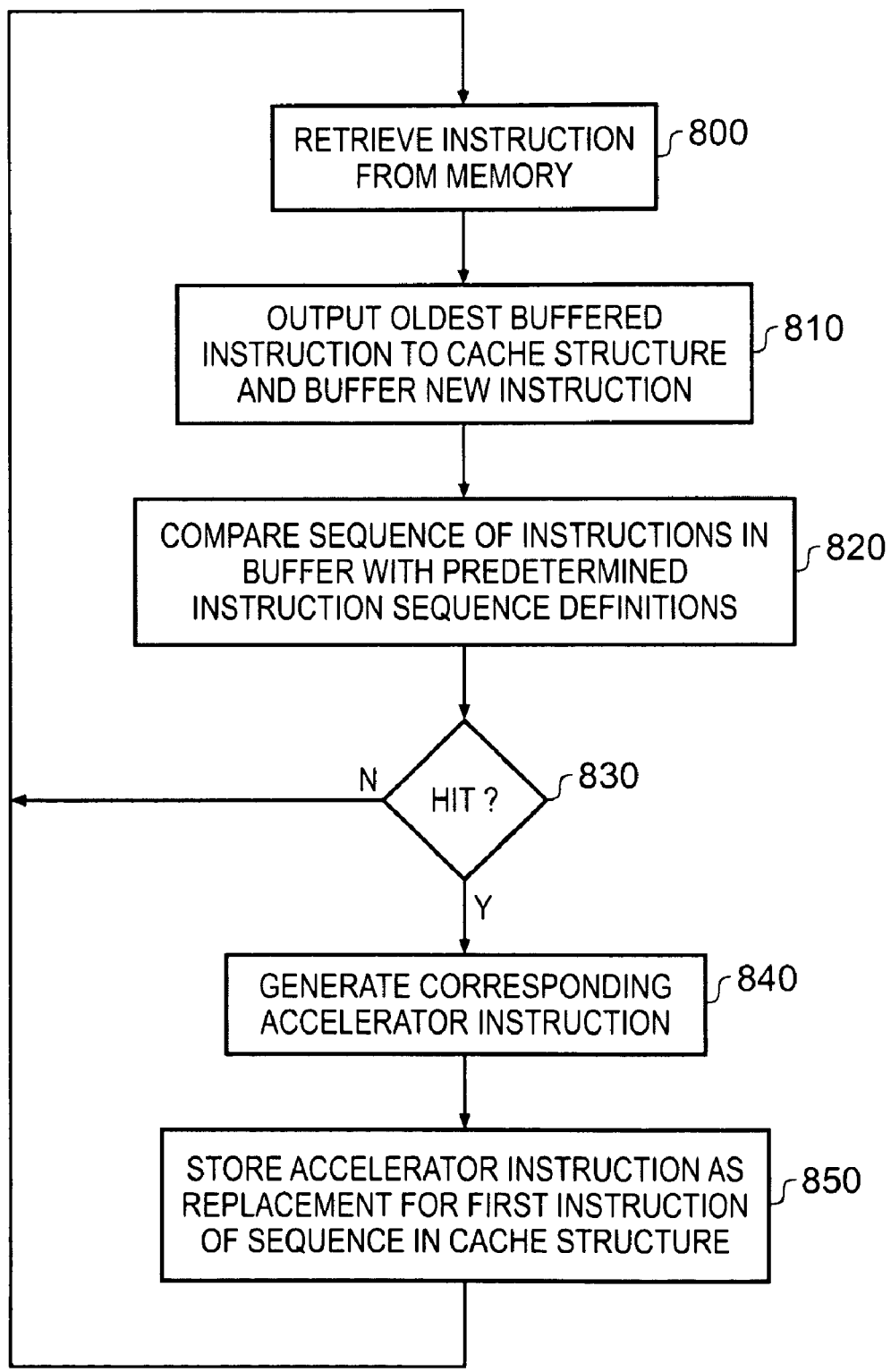
FIG. 9 is a flow diagram schematically illustrating the operation of profiling logic in accordance with one embodiment of the present invention.

FIG. 9 is a flow diagram schematically illustrating the operation of profiling logic in accordance with one embodiment of the present invention. At step 800, an instruction is retrieved from memory and at step 810 the oldest buffered instruction in the profiling logic is output to be stored in the cache structure, and the newly retrieved instruction is buffered within the profiling logic. The profiling logic at step 820 then compares the currently buffered sequence of instructions with its stored predetermined instruction sequence definitions. Then at step 830, if none of these hit the flow returns to step 800 and a new instruction is retrieved from memory. If however there is a hit, i.e. the sequence of instructions matches one of the predetermined instruction sequence definitions, then at step 840 the profiling logic generates the corresponding accelerator instruction and at step 850 the accelerator instruction is stored in the cache structure as a replacement for the first instruction of the sequence. Then the flow returns to step 800 and a new instruction is retrieved from memory.

Thus, the present invention provides a technique for identifying a sequence of instructions that is functionally equivalent to an accelerator instruction. When such a sequence of instructions is identified, the equivalent accelerator instruction is stored in a cache structure as a replacement for the first instruction of the sequence, with the remaining instructions in the sequence of instructions being stored unchanged. The accelerator instruction is an instruction that implements the function of that identified sequence and includes an indication to cause the processing unit to skip the remainder of the sequence when executing the accelerator instruction. Accordingly an improvement in power and performance occurs, because decoding and executing a single accelerator instruction is more efficient than decoding and executing multiple instructions, whilst memory addressing within the data processing system is unaffected.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A data processing apparatus comprising:
   a processing unit for executing instructions;
   a cache structure for storing instructions retrieved from memory for access by said processing unit; and
   profiling logic for identifying a sequence of instructions that is functionally equivalent to an accelerator instruction;
   wherein upon said identification said accelerator instruction is stored in the cache structure as a replacement for a first instruction of said sequence, with instructions in said sequence of instructions other than said first instruction being unchanged as a result of said identification; and
   said accelerator instruction includes an indication to cause the processing unit to skip the remainder of said sequence when executing said accelerator instruction.

2. A data processing apparatus as claimed in claim 1, wherein said profiling logic identifies said sequence of instructions before said sequence is stored in said cache structure.

3. A data processing apparatus as claimed in claim 1, wherein said profiling logic identifies said sequence of instructions when instructions are fetched from the cache structure by the processing unit.

4. A data processing apparatus as claimed in claim 1, wherein said accelerator instruction is stored in place of said first instruction of the identified sequence.

5. A data processing apparatus as claimed in claim 1, wherein said cache structure comprises a first cache for storing the instructions retrieved from memory and a dedicated accelerator instruction cache for storing said accelerator instruction.

6. A data processing apparatus as claimed in claim 5, wherein said accelerator instruction is a different length to said first instruction of the identified sequence.

7. A data processing apparatus as claimed in claim 1, wherein when said accelerator instruction is stored in the cache structure as a replacement for a first instruction of said sequence, said profiling logic further stores the accelerator instruction in an eviction repopulation cache along with an address identifier for the first instruction in said sequence.

8. A data processing apparatus as claimed in claim 7, wherein if the accelerator instruction is evicted from the cache structure, and said sequence of instructions is subsequently re-fetched from memory, the accelerator instruction is identified in the eviction repopulation cache with reference to the address identifier for the first instruction in the sequence, and re-stored in the cache structure as said replacement for said first instruction of said sequence.

9. A data processing apparatus as claimed in claim 1, wherein said processing unit comprises a hardware accelerator unit for executing said accelerator instruction.

10. A data processing apparatus as claimed in claim 1, wherein said profiling logic comprises profiling circuitry.

11. A data processing apparatus as claimed in claim 1, wherein said profiling logic comprises profiling software executed by said processing unit.

12. A data processing apparatus as claimed in claim 1, wherein said profiling logic buffers a plurality of received instructions, and compares said buffered instructions with at least one predetermined instruction sequence definition, each predetermined instruction sequence definition being associated with said accelerator instruction, if said buffered instructions match one of said at least one predetermined instruction sequence definitions, the profiling logic generating said associated accelerator instruction.

13. A data processing apparatus as claimed in claim 1, wherein there are a plurality of accelerator instructions for which the profiling logic seeks to identify sequences of instructions functionally equivalent thereto.

14. A method of processing data comprising the steps of:
retrieving instructions from memory for storage in a cache structure for access by a processing unit;
identifying a sequence of instructions that is functionally equivalent to an accelerator instruction; and
storing said accelerator instruction in the cache structure as a replacement for a first instruction of said sequence, with instructions in said sequence of instructions other than said first instruction being unchanged as a result of said identifying step; wherein
said accelerator instruction includes an indication to cause the processing unit to skip the remainder of said sequence when executing said accelerator instruction.

15. A data processing apparatus comprising:
processing means for executing instructions;
cache means for storing instructions retrieved from memory for access by said processing means; and
profiling means for identifying a sequence of instructions that is functionally equivalent to an accelerator instruction;
wherein upon said identification said accelerator instruction is stored in the cache means as a replacement for a first instruction of said sequence, with instructions in said sequence of instructions other than said first instruction being unchanged as a result of said identification; and
said accelerator instruction includes an indication to cause the processing means to skip the remainder of said sequence when executing said accelerator instruction.

* * * * *